UNITED STATES PATENT OFFICE.

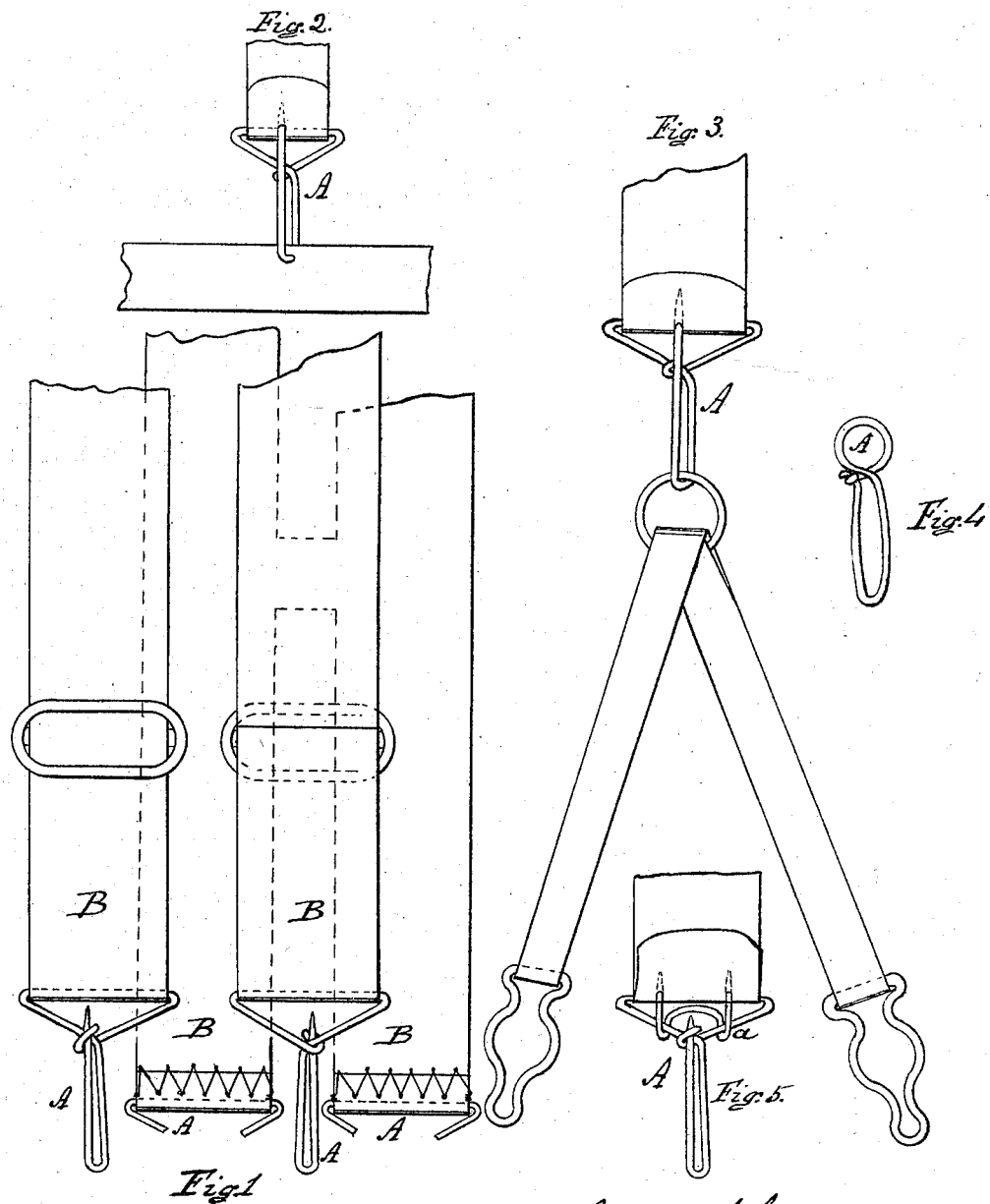

BENJAMIN J. GREELY, OF BOSTON, MASSACHUSETTS.

IMPROVEMENT IN SUSPENDERS.

Specification forming part of Letters Patent No. 141,926, dated August 19, 1873; application filed June 7, 1873.

*To all whom it may concern:*

Be it known that I, BENJAMIN J. GREELY, of Boston, Massachusetts, have invented certain Improvements in Suspenders, of which the following is a specification:

The object of my invention is to furnish a suspender which can be readily attached to and detached from the waistband of skirts, which shall be adapted to support as many skirts as are usually worn, and which shall meet a want, hitherto unsupplied, for a useful and efficient suspender for ladies. The main feature of my invention consists in the combination of the safety-pins with a suspender-strap, in the manner shown, thus producing suspenders which can readily be attached to and detached from one or more waistbands, as in Fig. 2, at any desired point.

The suspender thus formed is shown in Figure 1, where A A represent the safety-pins, attached, in the best manner known to me, to the straps B B. These devices, marked A in the various figures, are formed of a single piece of wire, except in Fig. 5, bent into the form shown.

When it is desired to make the strap adjustable in length I use the slides, as shown in Fig. 1, or else lengthen the free end of the device A, as shown in Fig. 2, and thus make it a buckle and safety-pin combined. The same result will be obtained by the addition of the piece of wire *a* in Fig. 5, bent as shown.

Fig. 3 indicates another use of my device, and Fig. 4 shows a slightly different form of it.

What I claim as my invention is—

1. The safety-pin A, when constructed substantially as herein shown.
2. The combination of the safety-pins A and suspender-straps B, in the manner described.

Signed this 4th day of June, 1873.

B. J. GREELY.

Witnesses:
HENRY W. HOLLAND,
J. E. MAYNADIER.